Oct. 26, 1943.  A. MUSSCHOOT  2,332,659
BEARING CLEANING AND LUBRICATING SYSTEM
Filed Feb. 14, 1941
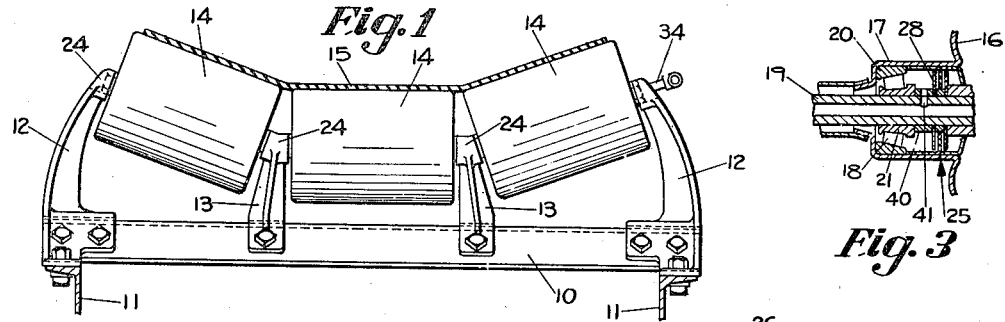
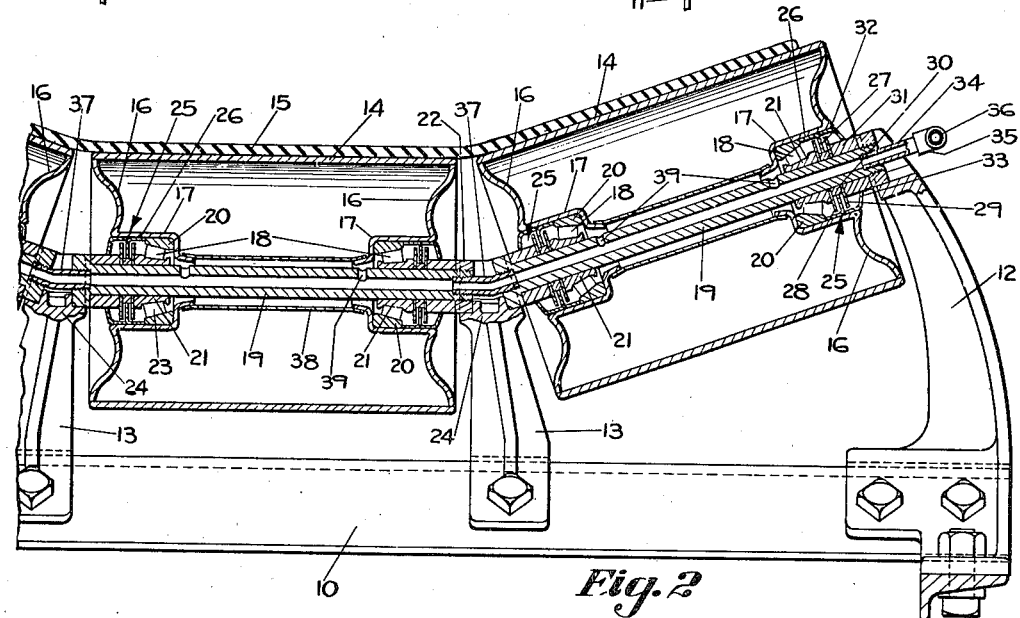
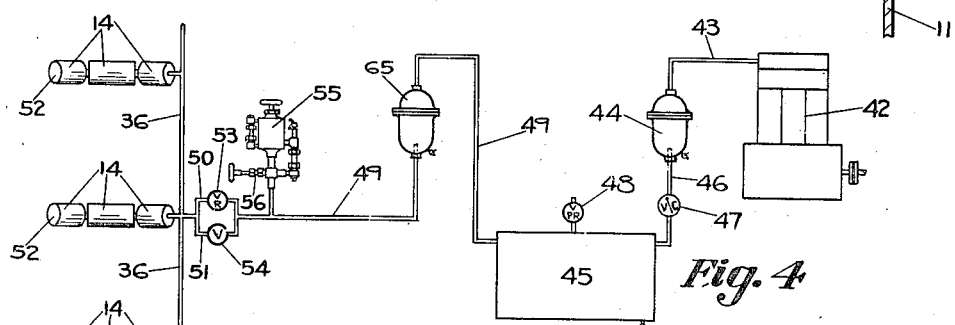
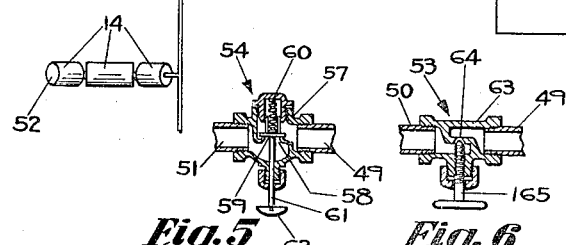
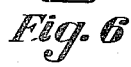
INVENTOR:
ALBERT MUSSCHOOT,
By Chas. M. Nissen,
ATTY.

Patented Oct. 26, 1943

2,332,659

UNITED STATES PATENT OFFICE 2,332,659

BEARING CLEANING AND LUBRICATING SYSTEM

Albert Musschoot, Columbus, Ohio, assignor to The Jeffrey Manufacturing Company, a corporation of Ohio Application February 14, 1941, Serial No. 378,954

7 Claims. (Cl. 184—7)

My invention relates to a bearing cleaning and lubricating system and one of its objects is the provision of improved and efficient means for producing and maintaining a flow of air through bearings and bearing seals to prevent the entrance of particles of dust or foreign matter to said bearings and to remove any particles of foreign matter therefrom.

A further object of the invention is to provide improved means for introducing bearing lubricating oil to said flow of air for lubricating said bearings.

Another object of the invention is to provide improved means for cleansing and lubricating a plurality of separately mounted bearings from a single source of compressed air and a single introduction of lubricating oil.

A still further object of the invention is to provide improved mechanism whereby a blast of compressed air of considerable volume may be introduced should any of the bearing housings require the removal of particles of solids that may originate inside of the bearing housings or require periodically a greater than normal amount of lubricating oil.

More particularly it is the object of the present invention to provide mechanism for producing and directing a flow of air with or without the introduction of lubricating oil to the bearing housings of a series of belt conveyor idlers each one of which has a plurality of bearings.

Other objects of the invention will appear hereinafter, the novel features and combinations being set forth in the claims hereto appended.

Referring to the accompanying drawing

Fig. 1 is an elevation of a troughing type belt conveyor idler;

Fig. 2 is a sectional view of the belt idler of Fig. 1, the section being taken along the transverse center line.

Fig. 3 shows a modification of the device of Fig. 2 in the placement of the bearing seal and the port of entrance for air such that the air will pass outwardly of the seal without necessarily going through the bearing.

Fig. 4 is a diagrammatic layout of a plurality of idlers with the apparatus necessary for producing the flow of compressed air and introducing thereinto the lubricating oil.

Fig. 5 is a cross section of a quick acting valve used in the main compressed air line.

Fig. 6 is a cross section of a reducing valve also used in the main compressed air line.

Referring to the drawing, Fig. 1 shows an assembled belt conveyor idler comprising a cross member 10 supported on longitudinal stringers 11, one on each side and which may carry any desired number of idlers spaced as practice dictates. End brackets 12 and center brackets 13 carry for free rotation idler pulleys 14 of which the outside ones are inclined to the horizontal to trough the belt 15.

As shown in Fig. 2 each pulley 14 is provided with substantially closed ends 16 each of which includes a bearing housing 17 formed integral therewith. Anti-friction bearings 18 are interposed between the housings 17 and a shaft 19 which is non-rotatably carried by the brackets 12 and/or 13. Outer races 20 of the bearings 18 are pressed into the housing 17 for rotation therewith and inner races 21 thereof are fitted to the shaft 19 so that there is little tendency for the races 21 to revolve but they are sufficiently loose to permit longitudinal adjustment by means of a nut 22 screw threaded to the end of the shaft 19 to adjust the bearings 18 so that the roller 23 may roll easily. The nut 22 may be square, hexagonal or other shape and is seated in a correspondingly shaped pocket in a boss 24 of the brackets 12 or 13.

Dirt seals 25 are fitted into the outer ends of the housings 17 and on the shaft 19 in such manner as to present tortuous passages for dust particles that might attempt to gain entrance to the bearing housings 17. The seals may be of any suitable type but as herein shown each comprises a circular cup shaped member 26 fitting tightly the bore of the housing 17 and rotating therewith. A radial flange 27 of the cup shaped member 26 projects between circular plate like members 28 and 29 fitting the shaft 19 and held in spaced relation and against the inner race 21 of the bearings 18 by a collar 30 placed therebetween and a collar or sleeve 31 placed between the member 29 and the nut 22. Tightening of the nut 22 clamps the members 28 and 29 with collars 30 and 31 against the inner race 21 of the bearing and not only holds the race 21 in proper adjustment but also holds the members 28 and 29 in proper relation to the flange 27 to form a seal. If desired an additional cup like member 32 may be fitted into the housing 17 with its inner edge abutting the member 26 and its radial inwardly extending flange 33 closely fitting the outside diameter of the sleeve 31.

The shaft 19 is hollow and is screw threaded at its outer ends to receive, at one end, a pipe fitting 34 which may be connected by a T 35 to an air line 36 which extends the entire length of the belt conveyor or along a predetermined section thereof. At its inner end the shaft 19 is connected by a curved pipe 37 to an adjacent shaft 19, so as to provide one continuous passage from one side of the belt idler to the other. Ordinarily the left hand end of the shaft 19 of the left hand idler will be provided with a plug (not shown), however, if it be desirable the line 36 may be extended on both sides of the conveyor and connected to each outer idler.

In order to enclose the bearings inside of the pulleys 14 I have provided a tubular member 38 which encircles the shaft 19 and is connected at its ends to the inner end of the housings 17.

Openings 39 in the shaft 19 in close proximity to the bearings 18 but inwardly thereof as shown in Fig. 2 permit the flow of air through the bearings 18 and out to atmosphere through the seals 25. Such a flow of air outwardly of the seals 25 will prevent dust particles from moving inwardly of the seal and gaining access to the bearings and will blow out any foreign matter from the bearings 18.

In the modified form shown in Fig. 3 the seal 25 is spaced longitudinally a greater distance from the bearings 18 by the placement of a sleeve 40 between the inner race 21 and the member 28, which provides a passage for air from the hollow shaft 19 through an opening 41 and out the seal 25 without its having to pass through the bearings 18. This construction is desirable in case grease lubrication for the bearings 18 is used.

Referring to Fig. 4 it will be noted that I produce compressed air by use of an air compressor 42 which is connected by a pipe 43 through an air filter 44 adapted to remove any particles of dust and to a pressure tank 45 through a pipe 46 in which is placed a check valve 47 which will automatically close and retain air under pressure in the tank 45 should for any reason the compressor 42 be stopped. A pressure relief valve 48 is provided for the tank 45 to prevent building the pressures therein above safe limits. A pipe line 49 leading from the tank 45 has branches 50 and 51 through either of which air may be admitted to the air line 36 which extends along a row of idlers 52 (Fig. 4). A reducing valve 53 is placed in the branch line 50 to control the amount of compressed air normally flowing to the line 36. To provide an increase in the volume of air flow momentarily I have provided a quick acting valve 54 in line 51 the opening of which supplies a great volume of air such as may be necessary under certain conditions to blow particles of dust or metal outwardly of the bearings 18 and seals 25.

Generally indicated at 55 is a drip type lubricator that introduces oil into the air line 49. The oil will be atomized by the flow of compressed air and the passage of air flow through the bearings 18 will deposit the oil and provide bearing lubrication. A valve 56 of the lubricator 55 is provided to adjust the amount of oil being fed into the line 49. If desired an additional air filter 65 may be installed in the line 49 or the filter 44 may be moved to the position filter 65 now assumes.

In Fig. 5 I have shown a type of quick acting valve 54 that may be used although any other type that can be operated quickly from a closed position to a full open position may be used. This valve 54 comprises a body 57 in which is a port 58 normally closed by a valve plate 59 and held in that position by a spring 60. A valve stem 61 extends from the valve plate 59 to the outside of the body 57 and is provided with a button type handle 62 which when pressed will open port 58 to its full opening.

In Fig. 6 I have shown a type of reducing valve 53 that may be used although any other type that will control the flow of compressed air and is adjustable to obtain slight change over a fairly wide range will be suitable. This valve 53 comprises a body 63 having therein a tapered port 64 into which is adapted to be inserted the tapered end of an adjustable valve stem 165.

When the belt conveyor is in operation the travel of the belt 15 rotates the pulleys 14 and cleansing and lubrication of the bearings 18 is accomplished by the flow of air and oil. The compressor 42 is either continuously operated or intermittently operated and air under pressure stored in pressure tank 45. Any particles of dust that may be entrained in the air leaving the compressor 42 are removed by passage through the filters 44 or 65 whichever one is used therefore clean air is supplied to the air line 36 from whence it passes through the hollow shafts 19 and from there to all the bearings 18 and out the seals 25 to atmosphere. Adjustment of the quantity of lubricating oil introduced into the flow of air is accomplished by manipulation of the valve 56. In normal operation the quick acting valve 54 is closed and reducing valve 53 is open to permit the passage of a desirable flow of air, just sufficient to maintain an outward flow of air through the seals 25 to prevent the entrance of dust particles and to carry the lubricating oil to the bearings 18. In order to be sure that unnecessary wear on the bearings and other parts does not occur due to solid particles originating in the system the quick acting valve 54 is periodically operated to cause a greatly increased volume of air passing through the bearings and seals which will blow out the system and rid it of such particles as well as cleanse it of old oil. During such times as the quick acting valve 54 is open the valve 56 of the lubricator 55 may be opened to supply a greater quantity of oil, this however should only take place after the system has been cleansed by operation of the quick opening valve.

It is to be understood that this system of cleansing and lubricating bearings is applicable to uses other than with belt conveyor idlers.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a pneumatic cleaning system for bearings, the combination with a support, of a rotary device, mechanism journaling said device on said support, a housing for said journaling mechanism having inlet and outlet openings on opposite sides of said journaling mechanism, means comprising a pneumatic pressure conduit for directing compressed air to said journaling mechanism and through said housing openings, and a quick acting valve in said conduit serving when opened to effect a quick blast of compressed air through said housing.

2. In a lubricating system, the combination with mechanism to be lubricated, of means comprising a conduit for directing compressed air to said mechanism, a valve in said conduit adapted to be moved to fully opened position suddenly to secure a blast of compressed air at said mechanism to clean the same of foreign matter, another valve in said conduit in parallel with said first-named valve and adapted to be opened gradually to an adjusted extent to control the rate of continuous flow of compressed air to said mechanism, a lubricator connected to said conduit, and a third valve for controlling the flow of lubricant to said conduit for flow with compressed air to said mechanism.

3. In a cleaning and lubricating system, the combination with a support, of a rotary device, bearing means supporting said rotary device on said support, a housing for said bearing means having inlet and outlet openings on opposite sides thereof whereby air flowing through said housing passes through said bearing means, a source of air under pressure, conduit means directing the air to flow to said housing inlet opening and through said housing, means for injecting lubricating medium into said conduit means so it is conveyed by said air to lubricate said bearing means, and valve means for controlling the flow of air through said conduit means at either a high rate to remove foreign matter therefrom or at a low rate to carry the lubricating medium to said bearing means.

4. In a cleaning and lubricating system, the combination with a support, of a rotary device, bearing means supporting said rotary device on said support, a housing for said bearing means having inlet and outlet openings, a source of air under pressure, conduit means directing the air to flow to said housing inlet opening and through said housing, means for injecting lubricating medium into said conduit means so it is conveyed by said air to lubricate said bearing means, and valve means for controlling the flow of air through said conduit means at either a high rate to remove foreign matter therefrom or at a low rate to carry the lubricating medium to said bearing means.

5. In a cleaning and lubricating system, the combination with a support, of a rotary device, bearing means supporting said rotary device on said support, a housing for said bearing means having inlet and outlet openings the latter of which is partially but not entirely closed by a dirt seal, a source of air under pressure, conduit means directing the air to flow to said housing inlet opening and through said housing, means for injecting lubricating medium into said conduit means so it is conveyed by said air to lubricate said bearing means, and valve means for controlling the flow of air through said conduit means at either a high rate to remove foreign matter therefrom or at a low rate to carry the lubricating medium to said bearing means.

6. In a belt idler, the combination with a shaft, an idler roller, a bearing supporting said roller on said shaft, a housing for said bearing having air inlet and outlet openings, a dirt seal partially closing said outlet opening, said openings being on opposite sides of said bearing, and means supplying air under pressure to flow successively through said housing openings at a sufficiently high rate to remove foreign matter therefrom.

7. In a belt idler, the combination with a shaft, an idler roller, a bearing supporting said roller on said shaft, a housing for said bearing having air inlet and outlet openings, a dirt seal partially closing said outlet opening, and means supplying air under pressure to flow successfully through said housing openings at a sufficiently high rate to remove foreign matter therefrom.

ALBERT MUSSCHOOT.